US008306899B2

(12) United States Patent
Rabson et al.

(10) Patent No.: US 8,306,899 B2
(45) Date of Patent: Nov. 6, 2012

(54) MANAGING A LIFE INSURANCE INVESTMENT

(75) Inventors: Kenneth Steven Rabson, Fairmount Extension (ZA); Adrian Gore, Houghton Estate (ZA); Herschel Phillip Mayers, Senderwood (ZA)

(73) Assignee: Discovery Life Ltd., Sandton (ZA)

(*) Notice: Subject to any disclaimer, the term of this patent is extended or adjusted under 35 U.S.C. 154(b) by 1462 days.

(21) Appl. No.: 10/344,176

(22) PCT Filed: Aug. 7, 2001

(86) PCT No.: PCT/IB01/01406
§ 371 (c)(1),
(2), (4) Date: Aug. 15, 2003

(87) PCT Pub. No.: WO02/13438
PCT Pub. Date: Feb. 14, 2002

(65) Prior Publication Data
US 2004/0030625 A1    Feb. 12, 2004

(30) Foreign Application Priority Data
Aug. 7, 2000   (ZA) .................................... 2000/4014

(51) Int. Cl.
*G06Q 40/00* (2012.01)
(52) U.S. Cl. .............................. 705/37; 705/40; 705/4
(58) Field of Classification Search ............... 705/37, 705/4
See application file for complete search history.

(56) References Cited

U.S. PATENT DOCUMENTS

| | | | |
|---|---|---|---|
| 4,556,216 A | 12/1985 | Pitkanen | |
| 4,699,375 A | 10/1987 | Appelbaum et al. | |
| 4,831,526 A | 5/1989 | Luchs et al. | |
| 4,837,693 A | 6/1989 | Schotz | |
| 4,860,275 A | 8/1989 | Kakinuma et al. | |
| 4,975,840 A | 12/1990 | DeTore et al. | |
| 5,062,645 A | 11/1991 | Goodman et al. | |
| 5,136,502 A * | 8/1992 | Van Remortel et al. ......... | 705/2 |
| 5,301,105 A | 4/1994 | Cummings, Jr. | |
| 5,324,077 A | 6/1994 | Kessler et al. | |
| 5,429,506 A | 7/1995 | Brophy et al. | |
| 5,490,260 A | 2/1996 | Miller et al. | |
| 5,542,420 A | 8/1996 | Goldman et al. | |
| 5,549,117 A | 8/1996 | Tacklind et al. | |
| 5,550,734 A | 8/1996 | Tarter et al. | |
| 5,574,803 A | 11/1996 | Gaborksi et al. | |
| 5,631,828 A | 5/1997 | Hagan | |
| 5,655,085 A | 8/1997 | Ryan et al. | |
| 5,655,997 A | 8/1997 | Greenberg et al. | |
| 5,692,501 A | 12/1997 | Minturn | |
| 5,722,418 A | 3/1998 | Bro | |
| 5,745,893 A | 4/1998 | Hill et al. | |
| 5,752,236 A | 5/1998 | Sexton et al. | |
| 5,774,883 A | 6/1998 | Anderson et al. | |
| 5,832,467 A | 11/1998 | Wavish | |
| 5,867,821 A | 2/1999 | Ballantyne et al. | |
| 5,890,129 A | 3/1999 | Spurgeon | |
| 5,933,809 A | 8/1999 | Hunt et al. | |
| 5,933,815 A | 8/1999 | Golden | |
| 5,937,387 A | 8/1999 | Summerall et al. | |
| 5,987,434 A | 11/1999 | Libman | |
| 5,991,744 A | 11/1999 | Dicrese | |
| 6,039,688 A | 3/2000 | Douglas et al. | |
| 6,049,772 A * | 4/2000 | Payne et al. ...................... | 705/4 |
| 6,085,174 A | 7/2000 | Edelman | |
| 6,085,976 A | 7/2000 | Sehr | |
| 6,108,641 A | 8/2000 | Kenna et al. | |
| 6,112,986 A | 9/2000 | Berger et al. | |
| 6,151,586 A | 11/2000 | Brown | |
| 6,163,770 A | 12/2000 | Gamble et al. | |
| 6,230,142 B1 | 5/2001 | Benigno et al. | |
| 6,385,589 B1 | 5/2002 | Trusheim et al. | |
| 6,602,469 B1 * | 8/2003 | Maus et al. .................. | 422/68.1 |
| 6,611,815 B1 | 8/2003 | Lewis et al. | |
| 7,319,970 B1 | 1/2008 | Simone | |
| 7,380,707 B1 | 6/2008 | Fredman | |
| 7,383,223 B1 | 6/2008 | Dilip et al. | |

(Continued)

FOREIGN PATENT DOCUMENTS

AU       2001/276596       3/2003

(Continued)

OTHER PUBLICATIONS

The Penguin Buisiness Dictionary, 2003.* Maintaining Health Insurance During a Recession: Likely COBRA Eligibility[PDF] from commonwealthfund.orgCOBR         Act—2001—mobile.commonwealthfund.org.*
The Coneept of the Level-Premium Whole Life Insuranee Poliey. Reexamined Author(s): Robert I. Mehr, The Journal of Risk and Insuranee, vol. 42, No. 3 (Sep. 1975), pp. 419-431 Published by: American Risk and Insurance Association.*
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.

(Continued)

*Primary Examiner* — Hani M Kazimi
*Assistant Examiner* — Chuks Onyezia
(74) *Attorney, Agent, or Firm* — Fleit Gibbons Gutman Bongini & Bianco, PL; Paul D. Bianco; Gary S. Winer

(57) ABSTRACT

A method of managing an investment of a policyholder which corresponds to a sum assured is described. The invention has particular application to life insurance. The policyholder selects a basic sum assured, and a periodic basic premium corresponding to the basic sum assured is calculated. The basic sum assured is linked to one or more financial indices so that the value of the total sum assured increases or decreases with changes in the value of the indices. An additional premium is calculated based on the cost of the linking, and a composite periodic premium is calculated. By using derivative instruments, the policyholder's investment corresponds to the actual sum assured from inception of the policy, compared with conventional schemes which involve the periodic investment of the policyholder's contributions.

13 Claims, No Drawings

U.S. PATENT DOCUMENTS

| | | | |
|---|---|---|---|
| 7,624,032 | B2 | 11/2009 | Radson |
| 2001/0037214 | A1 | 11/2001 | Raskin et al. |
| 2002/0002495 | A1 | 1/2002 | Ullman |
| 2002/0013717 | A1 | 1/2002 | Ando et al. |
| 2002/0029158 | A1 | 3/2002 | Wolff et al. |
| 2002/0035486 | A1 | 3/2002 | Huyn et al. |
| 2002/0038310 | A1 | 3/2002 | Reitberg |
| 2002/0049617 | A1 | 4/2002 | Lencki et al. |
| 2002/0055859 | A1 | 5/2002 | Goodman et al. |
| 2002/0087364 | A1 | 7/2002 | Lerner et al. |
| 2002/0103678 | A1 | 8/2002 | Burkhalter et al. |
| 2002/0111827 | A1 | 8/2002 | Levin et al. |
| 2002/0116231 | A1 | 8/2002 | Hele et al. |
| 2002/0116266 | A1 | 8/2002 | Marshall |
| 2002/0138309 | A1 | 9/2002 | Thomas |
| 2002/0152097 | A1 | 10/2002 | Javors |
| 2003/0009355 | A1 | 1/2003 | Gupta |
| 2003/0028483 | A1 | 2/2003 | Sanders et al. |
| 2003/0120521 | A1 | 6/2003 | Sherman |
| 2003/0149596 | A1 | 8/2003 | Bost |
| 2003/0200142 | A1 | 10/2003 | Hicks et al. |
| 2003/0233278 | A1 | 12/2003 | Marshall |
| 2004/0030625 | A1 | 2/2004 | Radson et al. |
| 2004/0039611 | A1 | 2/2004 | Hong et al. |
| 2004/0059608 | A1 | 3/2004 | Gore et al. |
| 2004/0088219 | A1 | 5/2004 | Sanders et al. |
| 2004/0267570 | A1 | 12/2004 | Becker et al. |
| 2005/0033609 | A1 | 2/2005 | Yang |
| 2005/0038679 | A1 | 2/2005 | Short |
| 2005/0102172 | A1 | 5/2005 | Sirmans, Jr. |
| 2005/0131742 | A1 | 6/2005 | Hoffman et al. |
| 2005/0222877 | A1 | 10/2005 | Radson et al. |
| 2005/0222878 | A1 | 10/2005 | Radson et al. |
| 2005/0228692 | A1 | 10/2005 | Hodgdon |
| 2005/0234712 | A1 | 10/2005 | Hodgdon |
| 2005/0240449 | A1 | 10/2005 | Radson et al. |
| 2005/0256748 | A1 | 11/2005 | Gore et al. |
| 2006/0041454 | A1 | 2/2006 | Matisonn et al. |
| 2006/0064320 | A1 | 3/2006 | Postrel |
| 2006/0074801 | A1 | 4/2006 | Pollard et al. |
| 2006/0129436 | A1 | 6/2006 | Short |
| 2006/0218011 | A1 | 9/2006 | Walker et al. |
| 2007/0027726 | A1 | 2/2007 | Warren et al. |
| 2007/0050217 | A1 | 3/2007 | Holden, Jr. |
| 2007/0233512 | A1 | 10/2007 | Gore |
| 2008/0005016 | A1 | 1/2008 | Uhlmann |
| 2008/0033751 | A1 | 2/2008 | Greene |
| 2008/0082372 | A1 | 4/2008 | Burch |
| 2008/0154650 | A1 | 6/2008 | Matisonn et al. |
| 2008/0189141 | A1 | 8/2008 | Gore et al. |
| 2008/0197185 | A1 | 8/2008 | Cronin et al. |
| 2008/0243558 | A1 | 10/2008 | Gupte |
| 2008/0255979 | A1 | 10/2008 | Slutzky et al. |
| 2009/0024419 | A1 | 1/2009 | McClellan et al. |
| 2009/0076903 | A1 | 3/2009 | Schwarzberg et al. |
| 2009/0150192 | A1 | 6/2009 | Gore et al. |
| 2009/0198525 | A1 | 8/2009 | Gore et al. |
| 2009/0240532 | A1 | 9/2009 | Gore et al. |
| 2009/0259497 | A1 | 10/2009 | Gore et al. |
| 2009/0265183 | A1 | 10/2009 | Pollard et al. |
| 2009/0299773 | A1 | 12/2009 | Gore et al. |
| 2009/0299774 | A1 | 12/2009 | Gore et al. |
| 2009/0299775 | A1 | 12/2009 | Gore et al. |
| 2009/0299776 | A1 | 12/2009 | Gore et al. |
| 2009/0307015 | A1 | 12/2009 | Gore et al. |
| 2010/0023354 | A1 | 1/2010 | Gore et al. |
| 2010/0023384 | A1 | 1/2010 | Pollard et al. |
| 2010/0049541 | A1 | 2/2010 | Pollard et al. |

FOREIGN PATENT DOCUMENTS

| | | |
|---|---|---|
| AU | 2005/323847 | 2/2007 |
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
U.S. Appl. No. 11/715,181, Response to Office Action Feb. 3, 2010.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/477,213, filed Jun. 3, 2009.
U.S. Appl. No. 12/477,225, filed Jun. 3, 2009.

U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
Rintelman, Mary Jane, "Choice and cost-savings", Credit Union Management, vol. 19, No. 7, pp. 48, 50. Jul. 1996.
Woodard, Kathy, "Stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4). PR Newswire, 1.
Art Technology Group; Discovery Holdings to exploit online interest in healthcare and life assurance with ATG commerce functionality; Revenue potential significant as 70% of Discovery members access the internet. (Oct. 28). M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwemedicalexams.aspx.
Definition of insurance, New Penguin Business Dictionary, Retreieved Oct. 26, 2008 from http://www.credoreference.com/entry/6892512/.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
U.S. Appl. No. 11/794,830, Supplemental response May 18, 2012.
U.S. Appl. No. 12/477,213 Supplemental Response filed Jun. 3, 2009.
U.S. Appl. No. 12/112,165, Non Final Office Action mailed May 17, 2012.
U.S. Appl. No. 12/912,040, Supplemental response filed Jun. 14, 2012.
U.S. Appl. No. 12/303,395 Response filed May 11, 2012.
U.S. Appl. No. 12/477,189 Response filed Mar. 5, 2012.
U.S. Appl. No. 12/303,399 Final Office Action Mar. 14, 2012.
U.S. Appl. No. 13/472,571, filed May 16, 2012.
U.S. Appl. No. 13/486,002, filed Jun. 1, 2012.
Discovery Life "The Discovery life Portfolio", 62 pgs—2008.
AFLAC "Personal Disability Income Protector", 6 pgs—Jul. 2003.
R.C. Olmstead, "Our Products" May 2008.
Discovery Life—"Why Discovery Life"—4 pgs-May 29, 2008.

GE Group Life Assurance Company—Group Short Term Disability Insurance—18 pgs, Oct. 29, 2004.
Wenfin Financial Services, "Discovery Life Plan" www.bmlink.co.za/WenFininsurance—Website download, 58 pgs, Aug. 5, 2011.
EconEdLink—"How Long is Your life?"—Tutorial from EconEdLink.com web-site, 4 pgs, posted Sep. 13, 2004.
AFLAC—"Personal Cancer Indemnity Plan" Level 3, 11 pgs, Jun. 2005.
Gendell Murray, "Retirement age Declines again in 1990s", Monthly Labor Review, 10 pgs, Oct. 2001.
Discovery Life "Benefit version Reference Guide" Oct. 2008.
Discovery Life—"Discovery life Group Risk Life Plan".
WenfinWebPages for Discovery Life Nov. 13, 2006.
AFLAC—Discovery Life "Application for Discovery Card Protector" Nov. 2007.
Discovery Life "The Disovery Life Portfolio" Nov. 20, 2008.
Discovery Life "Discovery Individual LIE PLAN Guide" Aug. 4, 2009 EconEdLink—How Long is Your life?—Tutorial from EconEdLink.com web-site, posted Sep. 13, 2004.
Discovery Life "The Discovery Life Portfolio" Jun. 2008.
Discovery Invest Group Retirement {Plan Financial Solutions for employees: Oct. 17, 2009.
ATG Customer Success Story: Discovery Heathly 2006 ART Tech Group, Inc.
Discovery Vitality; Discovery Vitality 2009 Sep. 12, 2008.
Discovery Invest, Group Retirement Plan Finanical solutions for employees Jan. 17, 2009.
Baker et al. Pay for Performance Incentive Programs in Healthcare; Market Dynammics and Business Process-Research Report 2003.
PruHealth, Individual Policy Document Jul. 2008.
Discovery Vitality, Lesson Plans Grade 4 nad 5 Apr. 2, 2008.
HLC Financial Services, Discovery News Feb. 2009.
The Discovery Life, "Technical guide for financial advisers" Nov. 2008.
DaSilva Roseanne The Impact of Wellness Activities on Hospital Claims Experience, Joint Colloquium of the IACA, PBSS and IAAHS May 2008 Oct. 1, 2004.
Destiny Health Individual Brochure Health Coverage modified Oct. 18, 2006.
BX Link Your Company Websites Discovery Life Plans Jan. 13, 2003.
Discovery Why Discovery Life May 29, 2008.
Preferred Health Systems—Preferred News—vol. 9, issue 1, Spring 2008.
Gore, The case for Consumer Engagement in the funding of Healthcare IAAHS 2007.
Web-site Google Search—Google Employee Wellness Payment—2 pgs, dated Feb. 12, 2012.
Wellness Source—How Much Does a Good Wellness Program Cost? —2 pgs.

* cited by examiner

MANAGING A LIFE INSURANCE INVESTMENT

BACKGROUND OF THE INVENTION

This invention relates to a method of managing an investment of a policyholder in a fund.

Traditional life insurance policies of the kind in which a policy holder pays periodic (e.g. monthly) premiums over a period of time generally have a relatively small cash value, in the early years of the policy contract. In the event of the policy holder needing to draw from the investment before maturity, the policy will usually have to be surrendered or borrowed against, and the return will generally be poor.

It is an object of the invention to provide an alternative method of managing a policy holder's investment.

SUMMARY OF THE INVENTION

According to a first aspect of the invention there is provided a method of managing an investment of a policyholder which corresponds to a sum assured, the method comprising:
 defining a basic sum assured;
 calculating a periodic basic premium corresponding to the basic sum assured;
 selecting at least one predefined index and linking the basic sum assured to the selected index to define a total sum assured, so that the value of the total sum assured increases or decreases with changes in the value of the selected index or indices;
 calculating an additional premium in accordance with predetermined factors relating to the cost of linking the basic sum assured to the selected index; and
 combining the basic premium and the additional premium in a periodic composite premium.

The method may include defining a reference level below which the value of the total sum assured may not decrease, irrespective of the performance of the selected index.

The reference level is preferably the basic sum assured.

The method may include defining a reference index to which the value of the total sum assured is linked, the reference index being selected to counteract inflation, with the effect that the value of the total sum assured increases annually by a minimum amount related to the annual increase in the reference index.

The reference index may be a consumer price index, such as the SA Consumer Price Index.

The index to which the basic sum assured may be linked is preferably a stock market related index or a currency market index.

For example, the stock market related index may be selected from the group comprising the FTSE 100 index, the S&P 500 index, the Nikkei 225 index, the ALSI 40 index, and other recognised stock market indices, and the currency market index may be selected from the group comprising a US dollar deposits index, a British pound deposits index, and other recognised currency market indices.

According to a second aspect of the invention there is provided a method of managing an investment of a policy holder which corresponds to a sum assured, the method comprising:
 recording a selection by the policy holder of a total sum assured;
 calculating a periodic premium corresponding to the total sum assured;
 recording a selection by the policyholder of at least one of a plurality of pre-defined future events;
 associating a selected insured amount, less than the total sum assured, with each selected pre-defined future event; and
 permitting, from time to time, the policy holder to draw from the fund an amount corresponding to the respective insured amount on occurrence of any of the pre-defined future events.

The pre-defined future events may include full or partial disability, so-called "dread diseases", infertility, and events effecting family members or children such as congenital birth defects or children's dread diseases, for example.

The selected insured amount associated with each pre-defined future event selected by the policy holder may be unrelated to the costs of treatment or other costs associated with the event in question.

Preferably, the fund is linked to one or more predefined financial indices.

For example, the fund may be linked to one or more of the FTSE 100, the S&P 500, the Nikkei 225, the ALSI 40 or other recognised stock market indices, a US dollar deposits index, a British pound deposits index or other recognised currency market indices, or a selected combination thereof, with the effect that the value of the total sum assured increases or decreases with changes in the value of the selected index or indices.

Preferably, the fund is further linked to a base index such as the South African Consumer Price Index (CPI), with the effect that the value of the total sum assured increases annually by a minimum amount related to the annual increase in the CPI.

The performance of the investment may be limited to a health index determined for the policyholder, the health index being calculated by comparing a plurality of test or measurement values of the policyholder to a set of predetermined reference values, the performance of the investment being adjusted according to the extent to which the test or measurement values differ from the reference values.

DESCRIPTION OF EMBODIMENTS

The present invention provides a method of managing a policy holder's investment in a fund, which is typically a life insurance fund, in a way which makes the fund useful to the policyholder from its inception. By contrast, conventional life insurance funds have a very low cash value in their early years, and a policy holder who surrenders the policy in such circumstances will receive a very poor return on the investment made up to that time. As an alternative, a policyholder may borrow against such a conventional policy in order not to surrender the policy, but the amount available will nevertheless generally be relatively low.

By contrast, the present invention manages a policyholder's investment in a completely different way. Firstly, the policyholder selects a basic sum assured. This is the nominal value of the policyholder's investment, which will be payable on the policyholder's death. A basic premium payable periodically by the policyholder, typically a monthly premium, is calculated according to the sum assured. However, instead of investing the actual premiums (less risk-associated costs) incrementally, a single investment, equivalent to investing the actual sum assured, is made using derivative instruments. The cost of purchasing these instruments is much less than the amount of the sum assured. In other words, the policyholder's investment has a value equal to the sum assured from inception, and the periodic premiums payable by the policyholder will reflect the costs associated with purchasing the investment. When the investment is linked to various indices as described below, the actual value of the investment (or sum assured) varies with the performance of the indices. This is completely different from conventional investment methods in which the growth of periodically invested premiums may be linked to an external fund or index.

The policyholder is also offered a selection from a number of pre-defined future events, such as full or partial disability (that is, the full or partial inability to work in the policyholders current occupation), so-called dread diseases such as cancer, stroke, myocardial infarction, kidney failure and similar diseases, health related events such as infertility, and events relating to the policyholder's children, such as congenital birth defects or children's dread diseases. Similarly, the pre-defined events may relate to other members of the policyholder's family. The policyholder may choose one or more of the predefined events, and also selects an insured amount in respect of each event. This insured amount need not be related to the cost of treatment of the event in question, or the cost of rectifying the situation should the event occur, but is discretionary. Obviously, the policyholder may choose an amount which is anticipated to cover the costs of treatment for a particular dread disease or the like, or, for example, the policyholder may choose a lesser or greater amount.

If and when a pre-defined event occurs (for example, if the policyholder has a stroke and this is one of the selected pre-defined events) the insured amount selected by the policyholder at the inception of the contract can now be drawn down against the total sum assured, leaving a balance which is the difference between the total sum assured and the withdrawn amount.

Obviously, if the policy holder were to draw down on the fund repeatedly over a period of time, the balance of the total sum assured would be reduced substantially. It is therefore desirable to provide for substantial growth of the investment. In a preferred form of the invention, growth of the investment is provided for by linking a basic sum assured to one or more of a number of predefined indices, with the value of the total sum assured being increased (or decreased) annually by the same percentage as the change in the selected index or indices. In order to provide a "safety net" feature, a reference index is selected, for example, the South African Consumer Price Index (CPI), with the value of the investment being increased by the change in the CPI as a minimum if the other index or indices to which the index is linked show a smaller increase, or a decrease. A suitable local CPI can be selected for each country in which the method of the invention is operated.

Where the policy holder chooses the "linked fund" option, a higher total premium will be charged compared with the basic premium for the basic fund described above. This additional premium is computed by modelling expected future performance of stock markets and currencies and combining this with actuarial theory to determine the probabilities of paying a policyholder claim, which includes the modelled investment growth, at various durations in the policy term. The higher composite premium comprises the additional premium added to the basic premium.

In any event, the linked investment will not be allowed to reduce below its inception level as a result of negative performance of the selected index or indices. Importantly, the composite or total premium does not vary with changes in the value of the selected index or indices over time. The policyholder may select the linked fund option at inception of the policy, or may choose this option later. Conversely, the policy holder may cancel the linked option if he or she so desires. As a practical matter, a change of status from a linked fund to a delinked fund or vice versa will be required to be made on the contract anniversary. If a linked fund is delinked, the value of the total sum assured will be determined by performance of the selected indices up to the date of delinking, The following equity, currency and combination indices were selected for the initial commercial embodiment of the invention:

1. Equity choices:
FTSE 100
S&P 500
Nikkei 225
ALSI 40
2. Currency choices:
United States Dollar
British Pound Sterling
3. Combinations:
Global Aggressive—comprising a mix of equity indices as defined by the fund manager
Global Moderate—comprising approximately 60% in equity indices and 40% in currency and bond indices as defined by the fund manager
Global Conservative—comprising approximately 80% in cash and bond indices and 20% in equity indices as defined by the fund manager.

The list of indices and currencies above is not exhaustive and can be varied or be added to over time. Any recognised equity, currency, bond and property index or mix of these indices may be available at a later point in time.

Protection against Rand devaluation relative to other currencies is also provided and is dependant on the particular indices selected. For example, the S&P 500 provides Rand/Dollar hedging, whereas the FTSE 100 provides Rand/Pound hedging. For ease of administration and reporting, the fund manager will convert all performance into US Dollars. The original capital and index growth will then benefit from Rand hedging.

The policyholder will need to comply with linkage selection rules as defined by the fund manager from time to time. At inception of the contract, the policyholder may select any combination of the above linkages with the proviso that there is never less than 25% in any one choice.

By way of example, assume that the initial total sum assured was R1 000 000.00 and dread disease cover with an insured amount of R400 000.00 had been selected. Assume further that at the time of the policyholder claiming in respect of the dread disease the indices to which the investment was linked had a cumulative growth of 10%. In this case, the nominal value of the total sum assured will be R1 100 000.00. The payout to the policyholder in respect of the dread disease claim would be increased pro rata, so that R440 000.00 would be paid out, with R660 000.00 remaining in the fund.

There is no vesting of linkage performance returns, except when making a claim on occurrence of one of the selected pre-defined future events, or on the death of the policyholder, and the policyholder cannot access the fund except on the occurrence of one of the selected events.

The treatment of indices over time will be as defined in line with widely accepted rules and regulations of various bodies licensed to trade in financial derivative instruments. This allows for the dissolution of a particular index, the merger of any indices, the splitting of indices and denomination of indices. Should a particular index cease to exist, the policyholder will be forced to switch into another index of choice. The formation of the European Monetary Union and similar events may also lead to currency changes and re-indexing of a particular index to a different base rate.

A further refinement of the fund is the linking of the policyholder's investment to a Health Index which is used to assess the change in health of the policyholder from year to year, with the intention of rewarding the individual by improved performance of his or her investment for improvements in selected measurements relating to his or her health, particularly those which are within the control of the policyholder.

The Health Index is based on objective measurements, including histology measurements as well as physical measurements of the policyholder (or other insured individuals). An improvement in Health Index values from one year to the next is used to provide a "Health Boost" to the value of the policyholder's investment, which will be in excess of the minimum CPI growth already provided for. Improvements in health as indicated by the Health Index cannot be eroded in future years by negative performance of the indices selected for linking to the investment. A worsening of health as measured by the Health Index can reduce the value of the investment, but never below the original total sum assured as increased by the CPI on an annual basis.

In a preferred version of the invention, the Health Index feature and hence the annual "Health Boost" are only provided to policyholders purchasing both a life assurance investment according to the invention and joining a related health insurance/medical aid scheme.

The Health Index operates by awarding points for certain information medically regarded as improving one's health. Either 5 or 10 points will be awarded as follows:

| Index | 5 | 10 |
|---|---|---|
| INDIVIDUAL LIFE HEALTH INDEX | | |
| Cholesterol | 3.6-5.2 mmol/l | 3.6-4.2 mmol/l |
| HDL | 0.91-1.64 mmol/l | >1.65 mmol/l |
| LDL (without medication) | 2.62-4.53 mmol/l | <2.62 mmol/l |
| Body mass index | 25-23 | 22-20 |
| Blood Pressure (measured quarterly) | 120/80 mmHg | |
| Fitness Level | III-IV | V |
| Diabetes - HBA 1c 6 monthly | 7.2-8 mmol/l | <7.1 mmol/l |
| Hypertension - Measured quarterly | 140/90 mmHg | 120/80 mmHg |
| Hyperlipidaemia - | <6.25 mmol/l | <6.25 mmol/l |
| HDL | — | 0.91-1.64 mmol/l |
| LDL | — | 2.62-4.53 mmol/l |
| Asthma - Biannual lung function tests | — | FEV1 > 80% predicted FVC > 80% predicted TLco > 80% predicted FEV1/FVC > 75% predicted |
| GROUP LIFE HEALTH INDEX | | |
| Days absenteeism per member | 3-7 | <3 |
| Hospitalisation days per member | <5 | 0 |
| % non smokers per year | <10 | 10-20 |
| Average BMI of group | 25-23 | 22-20 |
| % members joined health club and visits >6 per year | 20-30 | >30 |

The items carry equal weighting in determining the index which commences at inception of the contract at a level of 100. When the ratio of each year's index to the previous year's index reflects an improvement in health, this will be translated into an increase in the total sum assured, where the percentage increase is not the same as the index percentage improvement, but rather a factor of this improvement percentage.

As shown in the tables above, the criteria for group life business differ from those of individual life business. In the case of group life business, the employer will be offered a decrease in life premiums rather than an increase in the value of the total sum assured, should this be required.

EXAMPLE

Assume a policy is purchased for R1 000 000 and that the policyholder requests linking to the FTSE 100 Index. Assume the FTSE 100 Index now stands at 6000 and that the CPI is 8% per annum. Column A below shows the investment growing annually at CPI, while Column B shows the investment growing at the CPI plus a 2% "Health Boost" at the end of the first year, but no boost in the second year. Column C reflects only the FTSE 100 performance (arbitrary numbers are used for performance in the table below). Only 30 months are shown for illustration purposes.

On death of the policyholder at any point in time, the highest of Columns A, B and C will be paid as the benefit.

| Month | FTSE 100 | A (with CPI only) Lifestyle Fund | B (with CPI and Health Index) Lifestyle Fund | C (with FTSE only) Lifestyle Fund |
|---|---|---|---|---|
| 1 | | 1000000 | 1000000 | 1000000 |
| 2 | | 1000000 | 1000000 | 1013200 |
| 3 | | 1000000 | 1000000 | 1013205 |
| 4 | | 1000000 | 1000000 | 1100000 |
| 5 | | 1000000 | 1000000 | 1098240 |
| 6 | | 1000000 | 1000000 | 1049500 |
| 7 | | 1000000 | 1000000 | 1042000 |
| 8 | | 1000000 | 1000000 | 998097 |
| 9 | | 1000000 | 1000000 | 1024000 |
| 10 | | 1000000 | 1000000 | 1068000 |
| 11 | | 1000000 | 1000000 | 1067980 |
| 12 | | 1000000 | 1000000 | 1200000 |
| 13 | | 1080000 | 1100000 | 1087000 |
| 14 | | 1080000 | 1100000 | 1032098 |
| 15 | | 1080000 | 1100000 | 1028097 |
| 16 | | 1080000 | 1100000 | 1014000 |
| 17 | | 1080000 | 1100000 | 1013000 |
| 18 | | 1080000 | 1100000 | 1002110 |
| 19 | | 1080000 | 1100000 | 996240 |
| 20 | | 1080000 | 1100000 | 989000 |
| 21 | | 1080000 | 1100000 | 1001001 |
| 22 | | 1080000 | 1100000 | 1002453 |
| 23 | | 1080000 | 1100000 | 1001998 |
| 24 | | 1080000 | 1100000 | 1050650 |
| 25 | | 1166400 | 1100000 | 1064777 |
| 26 | | 1166400 | 1100000 | 1065890 |
| 27 | | 1166400 | 1100000 | 1098654 |
| 28 | | 1166400 | 1100000 | 1100295 |
| 29 | | 1166400 | 1 100 000 | 1129900 |
| 30 | | 1166400 | 1 100 000 | 1220000 |

The fund manager will use financial hedging instruments ("derivative instruments") including futures and options to achieve the linking. These instruments will be purchased via their respective global dealing exchanges.

The premium paid to the bank will differ based on the index purchased and the term of the derivative instrument, as well as investment market conditions prevailing at the time of purchase.

Derivative instruments are available from the banks with various terms ranging from 1 day to 10 years. The fund managers have developed a model to determine the allocation of funds to the various term instruments. This model is a cash flow model which examines the liquidity requirements of the company in terms of meeting benefit payments. The expected payments are based on actuarial mortality, dread disease and disability tables which the reflect the probability of a certain claim arising in any future month for a policyholder of a specific age. Because instruments of duration equivalent to the average life expectancy of individuals are not available (especially at the young ages), new instruments will need to be purchased on the maturity of the old instruments.

Because the renewal of the derivative contract on a regular basis will be at different prices to current prices, the insurer will typically reserve the right to increase the policyholders premium from time to time. These increases, if required, are not expected to be significant.

The average expected cost of the linking feature will result in the normal monthly life insurance premium being increased by 10% to 15% over the lifetime of the principal life insured.

It will be appreciated that while an embodiment of the invention has been described in which a South African Rand-based investment is linked to, inter alia, US and British stock market and currency market indices for hedging purposes, embodiments of the invention adapted for use in other countries may use different indices and hedging strategies.

The invention claimed is:

1. A method of managing a policyholder's investment in a life insurance fund managed by an insurance entity, the method comprising:
   executing, with a processor on an information processing system, the following
   recording a selection by a policyholder of a recurring premium risk insurance policy providing a basic sum assured to be paid in response to an event comprising at least one of a death of the policyholder and the policyholder attaining a prescribed age;
   setting an initial investment of the policyholder in an insurance fund as correlated to the basic sum assured;
   calculating a periodic basic premium based on the basic sum assured;
   recording a selection of at least one predefined index;
   linking the initial investment of the policyholder in the insurance fund to the predefined index;
   periodically adjusting the initial investment of the policyholder in the insurance fund correlated with movements of the predefined index, wherein adjusting the initial investment creates an adjusted initial investment;
   maintaining the adjusted initial investment in the insurance fund as an amount to be paid in the event comprising at least one of the death of the policyholder and the policyholder attaining the prescribed age;
   calculating an additional premium based upon at least a performance of the initial investment of the policyholder in the insurance fund to the predefined index;
   combining the basic premium which has been previously calculated and the additional premium which has been previously calculated to obtain a composite premium; and
   periodically charging the policyholder the composite premium as a recurring premium of the recurring premium risk insurance policy selected by the policyholder.

2. The method according to claim 1, further comprising:
   setting a reference level below which a value of the initial investment of the policyholder in the insurance fund may not decrease, irrespective of a performance of the predefined index that has been selected.

3. The method according to claim 2, wherein the reference level is the basic sum assured of the recurring premium risk insurance policy.

4. The method according to claim 1, further comprising:
   selecting and applying a cost-price index to a value of the initial investment of the policyholder in the insurance fund to counteract inflation, wherein applying the cost-price index to the value of the initial invest increases the initial investment annually by a minimum amount related to an annual increase in the cost-price index.

5. The method according to claim 4, wherein the cost-price index is a consumer price index.

6. The method according to claim 1, wherein the predefined index to which the initial investment is linked to is one of a stock market related and a currency market index.

7. The method according to claim 6, wherein the stock market related index is one of
   a FTSE 100 index,
   a S&P 500 index,
   a Nikkei 225 index, and
   a ALSI 40 index, and
wherein the currency market index is one of
   a US dollar deposits index, and
   a British pound deposits index.

8. The method of according to claim 1, further comprising:
   recording a selection by the policyholder of at least one of a plurality of predefined future events that occur prior to the event comprising at least one of the death of the policyholder and the policyholder reaching the prescribed age which has been attained;
   quantifying a selected insured amount, less than the basic sum assured, for each selected pre-defined future event; and
   permitting the policyholder to draw the selected insured amount, wherein the selected insured amount has been adjusted based on the periodic adjustment the initial investment, on occurrence of each predefined future event.

9. The method according to claim 8, wherein the plurality of predefined future events include at least one of one of full disability, partial disability, "dread diseases", infertility, and events affecting at least one of family members and children.

10. The method according to claim 8, wherein the selected insured amount associated with each pre-defined future event is unrelated to at least one of costs of treatment and other costs associated with the pre-defined future event.

11. The method according to claim 1, further comprising:
    correlating a performance of initial investment of the policyholder in the insurance fund to a health index determined for the policyholder;
    calculating the health index by comparing a plurality of at least one of test values and measurement values of the policyholder to a set of predetermined reference values;
    determining a set of differentials between the at least one of test values and measurement values and the set of predetermined reference values; and
    adjusting the performance of initial investment of the policyholder in the insurance fund according to the set of differentials determined.

12. A method of managing a policyholder's investment in a life insurance fund managed by an insurance entity, the method comprising:
    executing, with a processor on an information processing system, the following
    recording a selection by a policyholder of a recurring premium risk insurance policy providing a basic sum assured to be paid in response to an event comprising at least one of a death of the policyholder and the policyholder attaining a prescribed age;

setting an initial investment of the policyholder in an insurance fund as correlated to the basic sum assured;
calculating a periodic basic premium based on the basic sum assured;
recording a selection of at least one predefined index;
linking the initial investment of the policyholder in the insurance fund to the predefined index;
modeling an expected future performance of the predefined index;
determining a modeled investment growth of the initial investment based on the expected future performance of the predefined index that has been modeled;
determining a set of probabilities associated with paying a claim to the policyholder, including paying the claim with the modeled investment growth, at various durations of a term of the recurring premium risk insurance policy;
calculating an additional premium based upon the expected future performance that has been modeled, the investment growth that has been modeled, and the set of probabilities that has been determined;
combining the basic premium which has been previously calculated and the additional premium which has been previously calculated to obtain a composite premium; and
periodically charging the policyholder the composite premium as a recurring premium of the recurring premium risk insurance policy selected by the policyholder.

13. The method according to claim 12, wherein the composite premium does not vary with changes in a value of the predefined index over time.

* * * * *